United States Patent [19]

Moran et al.

[11] Patent Number: 4,606,688
[45] Date of Patent: Aug. 19, 1986

[54] REMOVABLE FASTENING ASSEMBLY

[75] Inventors: Thomas M. Moran, Cleveland, Ohio; Donald N. Oehlke, Troy, Mich.

[73] Assignee: Eaton Corporation, Cleveland, Ohio

[21] Appl. No.: 449,970

[22] Filed: Dec. 15, 1982

[51] Int. Cl.⁴ .............................................. F16B 37/04
[52] U.S. Cl. ..................................... 411/175; 411/427
[58] Field of Search ............... 411/103, 105, 104, 107, 411/108, 112, 111, 182, 177, 172, 173, 174, 175, 427

[56] References Cited

U.S. PATENT DOCUMENTS

| 1,768,505 | 6/1930 | Carr | 411/112 |
| 2,303,148 | 11/1942 | Tinnerman | 411/111 |
| 2,390,752 | 12/1945 | Tinnerman | 411/112 |
| 2,406,415 | 8/1946 | Tinnerman | 411/173 |
| 2,426,799 | 9/1947 | Tinnerman | 411/173 |
| 2,495,037 | 1/1950 | Tinnerman | 411/112 |
| 2,635,667 | 4/1953 | Murphy | 411/111 |
| 2,836,215 | 5/1958 | Rapata | 411/15 |
| 3,379,090 | 4/1968 | Parkin | 411/516 X |
| 3,574,899 | 4/1971 | Fisher | 411/172 |
| 3,752,032 | 8/1973 | Fiddler | 411/427 X |
| 4,300,865 | 11/1981 | Murray | 411/175 X |

FOREIGN PATENT DOCUMENTS

| 152580 | 10/1950 | Australia | 411/112 |
| 960120 | 12/1974 | Canada | 411/112 |
| 2131426 | 1/1972 | Fed. Rep. of Germany | 411/112 |
| 613974 | 12/1948 | United Kingdom | 411/427 |

Primary Examiner—Gary L. Smith
Assistant Examiner—Rodney M. Lindsey
Attorney, Agent, or Firm—C. H. Grace; A. E. Chrow

[57] ABSTRACT

Enclosed is a removable fastening assembly (80, 82, 84, 86) that can be secured to and removed from the same side of an opening in an article such as a plate (10) or the like into which an externally threaded member such as a screw ("S") is to be received by compressing opposed spaced-apart contracting means (18, 18', 58, 72) towards each other exposed on the side of the fastener facing away from the article opening (38) to cause a compressible member (16, 16', 56, 68) disposed on the side of the fastener facing towards the opening to contract sufficiently to be received into the opening with at least a portion thereof pressing against opposite sides of the wall of the fastener surrounding the opening with sufficient force to secure the fastener to the article upon release of the compressive force. The fastening assembly is provided with means (24, 24', 42, 44, 48, 76) for engaging the threads of the threaded member and enabling the threaded member to be secured to the fastening assembly and preferably includes a bridging member (12, 12', 12'') that is adapted to bridge across the article opening and has receiving openings disposed on opposite sides of the thread engaging means for receiving the contracting means therethrough.

6 Claims, 7 Drawing Figures

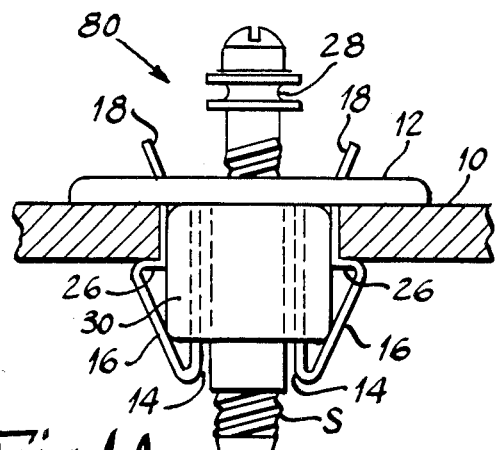
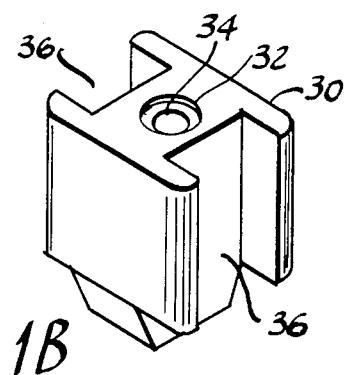
Fig.1A  Fig.1B
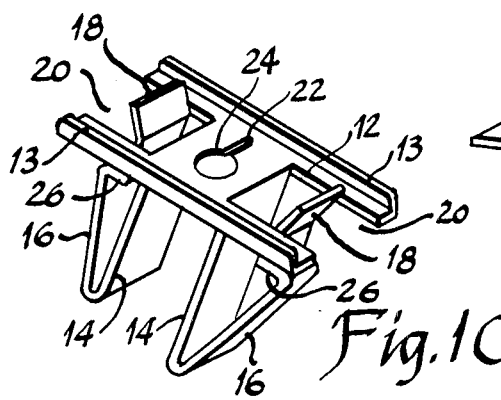
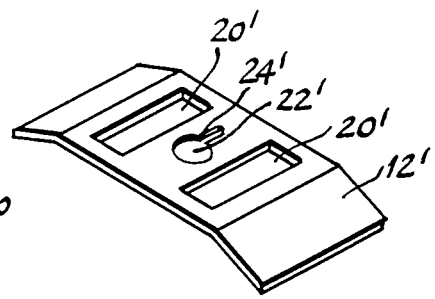
Fig.1C  Fig.1D
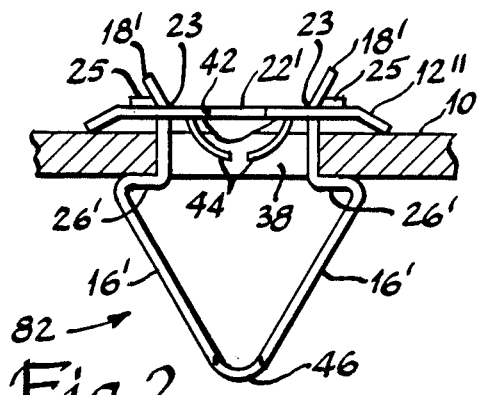
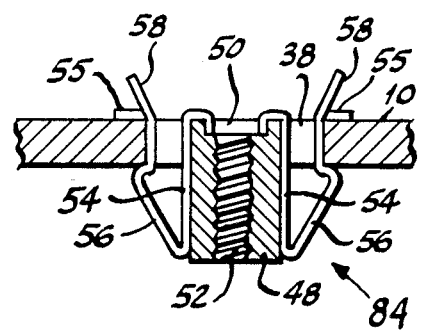
Fig.2  Fig.3

REMOVABLE FASTENING ASSEMBLY

This invention relates to a fastener for securing an externally threaded member to an article through an opening therein and more particularly to a fastener that can be removed from the same side of the article opening into which the threaded member is received.

BACKGROUND OF THE INVENTION

Fasteners for securing an externally threaded member to an article such as a plate or the like through an opening therethrough are well known in the art. Examples of such fasteners which utilize free-ends of resilient fingers or tongues for engagement with the threaded member are disclosed respectively in U.S. Pat. Nos. 2,239,797; 2,318,708; and 4,200,027, the disclosures of which are incorporated herein by reference. Other fasteners which utilize a helically deformed edge of an aperture through which the threaded member is inserted to engage and secure the threaded member to the article are respectively disclosed for example, in U.S. Pat. Nos. 2,239,797; 2,318,708; 2,228,548; 2,901,938; 3,362,278 and 4,200,027, the disclosures of which are incorporated herein by reference. Yet other fasteners utilize a combination of the free-ends of resilient fingers or tongues and a helically deformed edge of an aperture through which the threaded member is inserted to engage the threads of the threaded member are respectively disclosed, for example, in U.S. Pat. Nos. 2,434,844; 2,494,882; and 3,308,708, the disclosures of which are incorporated herein by reference.

Although fasteners of the type disclosed in the above referenced patents and others heretofor used to secure a threaded member to an article through an opening therein may be used to the particular advantage associated with each, they have characteristically required that the opening be located close to an edge of the article in order that the fastener can be clipped onto the edge over the opening or have otherwise required that the opening go completely through the article and that access be provided to the side of the article opening opposite to the side into which the threaded member is to be received in order to secure and remove the fastener from the article.

An example of a particular application which prior to the present invention has required access to the backside of the article to enable securement and removal of a fastener over an opening through the article through which the threaded member is received from the front side thereof is the adjustment screw(s) for adjusting the direction of vehicular headlights.

In view of the inability or inconvenience in many applications in having to provide access to the edge of an article or to the back side of an article in order to secure a fastener to an opening therein for securing a threaded member to the article inserted into the opening from the front side of the article, a need exists to provide a fastening assembly that can be easily inserted into an opening in an article and secured thereto from the side of the article opening into which the threaded member is to be received and that can be easily removed from the same side of the article.

SUMMARY OF THE INVENTION

Accordingly, it is an object of this invention to provide a removable fastening assembly that is able to secure an externally threaded member to an article through an opening therein in an easy and convenient manner.

It is another object of this invention to provide a removable fastening assembly that is able to secure an externally threaded member to an article through an opening therein that is not required to go completely through the article.

It is still another object of this invention to provide a removable fastening assembly that is able to secure an externally threaded member to an article through an opening therein with less restriction on the location of the opening than has heretofor been required of other fasteners.

It is yet another object of this invention to provide a removable fastening assembly for securing an externally threaded member to an article through an opening therein that can be easily secured to and removed from the same side of the article opening into which the threaded member is to be received.

DESCRIPTION OF THE DRAWINGS

FIG. 1A is a side elevation view of an embodiment of the fastening assembly of the invention securing a threaded screw to an article such as a frame for adjusting the direction of a vehicular headlight;

FIG. 1B is a perspective view of an embodiment of a nut used in the fastening assembly of FIG. 1A;

FIG. 1C is a perspective view of the fastening assembly of FIG. 1A without the threaded screw and without the nut of FIG. 1B;

FIG. 1D is a perspective view of an embodiment of a bridging member that may be used with various embodiments of the fastehing assembly of the invention; and FIGS. 2-4 are side elevation views of various emboidments of the fastening assembly of the invention secured to an article such as a plate.

DESCRIPTION OF THE PREFERRED EMBODIMENTS

Figure 4:
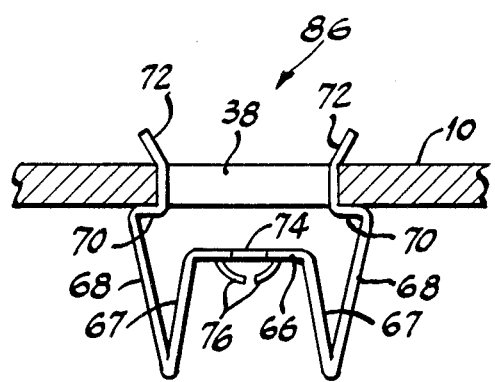

FIGS. 1A-1C show an embodiment of the fastening assembly of the invention in the form of assembly 80 that is adapted to adjust the direction of a vehicular headlight. Assembly 80 is shown in FIG. 1A securing a threaded member in the form of a screw "S" to an article 10 such as a plate or the like through an opening therein, not referenced. Assembly 80 has a bridging member 12 that is adapted to lay against the article with a portion thereof bridging across the side of the opening in article 10 into which screw "S" is to be received. As shown in FIGS. 1A and 1C, bridging member 12 has an aperture 22 therethrough adapted to receive screw "S" from the side of member 12 facing away from the article opening. Aperture 22 is at least partially surrounded by means for engaging the threads of screw "S" and causing screw "S" to advance therethrough and become secured to member 12 in response to rotation of screw "S" about the rotational axis thereof, not referenced. In assembly 80, slot 24 through member 12 extends radially outwardly from aperture 22 so that the edge of member 12 surrounding aperture 22 can be formed into a helical pattern able to engage the threads of screw "S". Longitudinal edges 13 of member 12 may be folded transverse to the plane of member 12 as shown in FIG. 1C where it is desired to increase the ridigity of member 12. Aperture 22 is disposed through member 12 intermediate a pair of spaced-apart receiving openings 20 through member 12 as shown in FIG. 1C.

A pair of spaced-apart resilient arms 14 respectively extend from the side of member 12 facing towards the opening in article 10 intermediate aperture 22 and the respective receiving opening 20 disposed on the same side of the aperture from which the respective arm 16 extends. Arms 14 respectively extend towards the opening in article 80 to which assembly 10 is to be secured and thence outwardly away from each other towards the side of member 12 facing towards the opening in article 10 in the form of arms 16 and thence through the respective receiving opening 20 through member 12 disposed on the same side of aperture 22 from which the respective arm extends to respective spaced-apart free-ends thereof to provide respective exposed portions 18 thereof that extend away from the side of member 12 facing away from the opening in article 10 to which assembly 80 is secured for a distance sufficient to enable a compressive force to be applied thereagainst causing respective exposed portions 18 to move towards each other.

Arms 16 respectively extend from arms 14 angularly outwardly away from each other towards member 12 to provide an enlargened section therebetween for which the distance in a plane substantially parallel to the plane of the opening through article 10 is greater than the distance between the opposite edges of article 10 surrounding the opening therein to which assembly 80 is to be secured.

Exposed portion 18 of arms 16 provide the means for contracting arms 16 towards each other from the side of member 12 facing away from article 10. Openings 20 and arms 16 are shaped such that application of a compressive force against exposed portions 18 is able to move portions 18 towards each other and cause arms 16 to contract towards each other an amount sufficient to enable the enlargened section between arms 16 to be received into the opening in article 10 while enabling member 12 to lay against article 10 on the side of the opening therein into which the threaded member is to be received and, upon the release of the compressive force, enable exposed portions 18 and arms 16 to expand away from each other in such a manner that a portion of the contracted enlargened section of arms 16 within the opening is able to press against opposite edges of article 10 surrounding the opening with sufficient force to secure assembly 80 to the article.

In cases where the opening goes through the article between opposite sides thereto (as is the case of the opening through article 10 in the FIGURES) arms 16 are preferably provided with means for engaging and pressing against the side of the article opposite to the side thereof on which the threaded member is received as a means of enhancing the securement of the fastening assembly of the invention to the article. Such means are provided in assembly 80 by portions 26 of each arm 16 that respectively extend towards each other before extending through the opening in article 10 for a distance sufficient to ensure that portions 26 are able to engage the side of article 10 opposite to the side thereof on which screw "S" is received when arms 16 are in the expanded condition within the opening through article 10.

A nut 30 is disposed between arms 14 on the side of member 12 facing towards the opening in article 10. Nut 30, as shown in FIG. 1B, has an opening 32 therethrough that is substantially coaxially aligned with aperture 22 and adapted to receive screw "S" from aperture 22. Although nut 30 may be secured to arms 14 and/or to member 12 in any suitable manner, arms 14 preferably extend substantially parallel to each other away from the side of member 12 facing towards the opening in article 10 and nut 30 is sized to provide a sliding fit between nut 30 and the respective arm 14 disposed on opposite sides thereof. Opening 32 is provided with means for engaging the threads of screw "S" to enhance the securement of screw "S" to assembly 80. Although any suitable means such as internal threads surrounding opening 32 within nut 30 may be used, nut 30 is preferably made from a suitable metallic or plastic material such as nylon material that can be threaded by the threads of screw "S" in response to rotation of screw "S" about the rotational axis thereof. Preferably, the wall of nut 30 surrounding opening 32 is provided with longitudinal slots 34 extending along the length of opening 32 to reduce the amount of material which screw "S" is required to thread as its advances through opening 32.

Nut 30 is preferably provided with an open-sided slot 36 disposed respectively along opposite sides of nut 30 as shown in FIG. 1B. Slots 36 respectively face towards the particular arm 14 disposed on the same side of nut 30 and are adapted to contain at least a portion thereof so as to enable arm 16 to interfere with nut 30 an amount sufficient to prevent the rotation thereof when screw "S" is advanced through opening 32 by rotation about the rotational axis thereof. Although nut 30 preferably has two slots 36 as previously described, nut 30 may have only one slot 36 disposed along one side of nut 30 for engaging only one arm 16 where such is sufficient to prevent the rotation of nut 30.

As previously described, assembly 80 is particularly adapted to secure a threaded member to an article to adjust the position of a vehicular headlight. In FIG. 1A, screw "S" is provided with an annular groove 28 that is adapted to engage with the frame of the headlight and cause the headlight to move upon the movement of screw "S" into and out of aperture 22 and opening 32 of nut 30 according to the direction in which screw "S" is rotated about the rotational axis thereof. Assembly 80 thus provides a means for adjusting the position of a vehicular headlight that can simply be inserted into an opening through an article such as a frame or the like and be easily removed from the same side of the article opening into which the threaded member is to be received by merely contracting exposed portion 18 towards each other as previously described.

FIG. 1D shows an embodiment of bridging member 12 in the form of member 12'. Member 12' has an aperture 22' therethrough disposed intermediate a pair of spaced-apart receiving openings 20' through member 12'. Openings 20' are completely enclosed by the wall of member 12' rather than being open-ended as are openings 20 of member 12. Like member 12, aperture 22' of member 12' has a slot 24' extending radially outwardly therefrom to enable the edge of member 12' surrounding aperture 22' to be formed into a helical pattern adapted to engage the threads of a threaded member inserted into aperture 22' and cause the threaded member to advance therethrough upon the rotation of the threaded member. The side of member 12' facing towards the article opening into which the threaded member is to be received is shaped in the form of a shallow convex configuration. Bridging member 12' illustrates that arms, such as arms 14 and 16 of FIG. 1C, may be removably secured to member 12 such as, for example, where arms 14 respectively extend through the receiving opening 20' disposed on the same side thereof and are folded toward each other on the side of member 12' facing away from the article opening into which the threaded member is to be received in a manner effecting their respective securement to member 12'.

FIG. 2 shows an embodiment of the fastening assembly of the invention in the form of assembly 82 secured to article 10 through an opening 38 therethrough. Assembly 82 has a bridging member 12" that is substantially the same as member 12' of FIG. 1D excepting that an aperture 22' is surrounded by a hollow open-ended frusto-conical projection 42 extending away from the side of member 12" facing towards opening 38. A pair of resilient arms 44 extend in overhanging relationship to projection 42 as shown in FIG. 2 to respective free-ends thereof that are spaced-apart from each other and which in conjunction with a warped helical edge of projection 42, not referenced, are adapted to coact with each other in engaging the threads of the threaded member and securing the threaded member to assembly 82 upon the advancement of the threaded member therethrough as is well known to those ordinarily skilled in the art of such fasteners.

Compressible means in the form of spaced-apart arms 16' extend from the side of member 12" facing towards opening 38. Arms 16' respectively extend outwardly away from each other towards the side of member 12" facing towards opening 38 to provide an enlarged section on the side of member 12" facing towards opening 38 having a distance between arms 16' in a plane substantially parallel to the plane of opening 38 that is greater than the distance between oposite edges of member 12" surrounding opening 38 to which assembly 82 is to be secured. As with assembly 80, spaced-apart contracting means extend from the enlarged section through opening 38 and through receiving openings in member 12", not referenced, to provide respective exposed portions 18' of arms 16'. A portion of arms 16' between each arm 16' and exposed portion 18' thereof is shaped in the form of portion 26', as shown in FIG. 2, to provide a means of enhancing the securement of assembly 82 to article 10 as previously described with respect to portions 26 of assembly 80. Although respective spaced-apart arms 16' may be secured together in any suitable manner, arms 16', portions 26' and exposed portions 18' are respectively preferably integral with each other as shown in FIG. 2 to provide a one-piece construction.

The receiving openings through member 12" and arms 16' are shaped so that a compressive force can be applied against exposed portions 18" causing them to move towards each other and cause arms 16' to contract towards each other an amount enabling the enlarged section of arms 16' to be received into opening 38 from the side of member 12" facing away from opening 38 and, upon the release of the compressive force, enable at least a portion of the enlarged section of arms 16' within opening 38 to expand and press against opposite edges of member 12" surrounding opening 38 with sufficient force to secure assembly 82 to article 10. The intersection between respective arms 16' may have an opening 46 for receiving the threaded member therethrough that is secured to assembly 82 where such is desired. Tabs 25 may be included where desired to enhance the securement of assembly 82 to joint 10. Tabs 25 are preferably made by folding a portion of exposed portion 18' of arms 16' so that they press adjacent the side of bridging member 12" facing away from article 10.

Assembly 82 differs from assembly 80 in that arms 16 are not secured to member 12" by means of arms 14 but rather are secured to member 12" by means of arms 16' having sufficient resilience to cause the portion of arms 16' within the respective receiving openings through member 12" to press against outer edge 23 of member 12" surrounding the respective receiving openings with sufficient force to secure arms 16' to member 12".

The invention thus broadly contemplates a removable fastening assembly having means for enabling an externally threaded member to be secured to the assembly and having a compressible member adapted to contract in a direction substantially parallel to the plane of the article opening into which the threaded member is to be received upon the application of a compressive force against opposite sides thereof in an amount sufficient to enable a section thereof to be received with the article opening with an exposed section thereof extending from the side of the article opening into which the threaded member is to be received and, upon the release of the compressive force, to enable at least a portion of the contracted section within the opening to expand and press against opposite edges of the article surrounding the opening with sufficient force to secure the assembly to the article while having an amount of the exposed section sufficient to enable a compressive force to be applied thereagainst in a direction causing the expanded portion of the compressible member within the article opening to contract an amount sufficient to enable removal of the assembly from the article from the same side of the article opening into which the threaded member is to be received.

FIG. 3 shows an embodiment of the assembly of the invention in the form of assembly 84 secured to article 10 through an opening 38 therethrough. Assembly 84 has an intermediate section in the form of nut 48 having an opening 50 therethrough and internal threads 52 for engaging the threads of the threaded member to be secured to assembly 84. A pair of arms 54 respectively extend from opposite sides of nut 48 and as shown in FIG. 3 and then angularly away from each other in the form of arms 56 in a direction that, before assembly 84 is secured to article 10, is away from opening 38 and thence to respective free-ends thereof that are adapted to enable a portion 58 of respective arms 56 to extend from the side of opening 38 into which the threaded member is to be received for a distance sufficient to enable portions 56 to be contracted towards each other to enable assembly 84 to be received into and removed from opening 38 as previously described. It is to be noted that arms 56 have a portion, not referenced, thereof adapted to press against the side of article 10 opposite to the side thereof on which the threaded member is to be received such as portions 26 of assembly 80 and portions 26' of assembly 82. Assembly 84 may also include tabs 55 shown in FIG. 3 which, as previously described for assembly 82, are adapted to press against the side of panel 10 into which the threaded member is to be received to enhance the securement of assembly 84 to panel 10 in the manner shown in FIG. 3.

FIG. 4 shows an embodiment of the fastening assembly of the invention in the form of assembly 86 secured to article 10 through opening 38 therein. Assembly 86 has an intermediate section 66 having an aperture 74 therethrough for receiving the threaded member and a pair of resilient arms 76 respectively extending from section 66 on opposite sides of aperture 74 in overhanging relationship to the side of section 66 which faces towards opening 38 before assembly 86 is inserted into opening 38. Arms 67 extend to respective spaced-apart free-ends thereof that are adapted to engage the threads of the threaded member and secure the threaded member to assembly 86 in response to rotation of the threaded member about the rotational axis thereof. Resilient arms 67 respectively extend from opposite sides of section 66 and thence in the form of arms 68 angularly away from each other in a direction away from opening 38 into which assembly 86 is to be received to provide an enlargened section in which the distance between arms 68 in a plane substantially parallel to the plane of opening 38 is greater than the distance between the opposite edges of article 10 surrounding opening 38 to which assembly 86 is to be secured. A portion 70 of both arms 68 extends inwardly towards opening 38 to provide the means of engaging the side of article 10 opposite to the side thereof from which the threaded member is to be received. Arms 68 respectively extend through opening 38 to respective spaced-apart free-ends thereof disposed away from the side of opening 38 into which the threaded member is to be received for a distance sufficient to provide respective exposed sections 72 of arms 68 against which a compressive force can be applied causing exposed portions 72 to move towards each other and cause arms 68 to move towards each other an amount sufficient to enable assembly 86 to be inserted into and removed from opening 38.

Although the assembly of the invention may be made in whole or part from any suitable metallic or plastic material or materials, at least the compressible portion of the assembly of the invention can be advantageously made from a suitable resilient sheet metal.

What is claimed is:

1. A removable fastening assembly adapted to be inserted into an article opening and to receive and secure and externally threaded member thereto and to enable the assembly to be removed from the same side of the article opening into which the threaded member is received, said assembly comprising:

a bridging member, said bridging member adapted to lay against the article and having a bridging portion thereof that bridges across the side of the article opening into which the threaded member is to be received, said bridging portion having an aperture therethrough for receiving the threaded member disposed intermediate pair of receiving openings respectively disposed therethrough on opposite sides of the aperture, and said bridging portion having means at least partially surrounding the aperture for engaging the threads of the threaded member and enabling the threaded member to advance through the aperture and into the article opening in response to rotation of the threaded member about a rotational axis associated therewith, a pair of spaced-apart resilient arms respectively extending for a distance into the article opening from the side of the bridging portion facing towards the article opening intermediate the aperture and each receiving opening and thence angularly away from each other in a direction towards the side of the bridging portion facing toward the article opening to provide an enlarged section thereof taken in a direction substantially parallel to the plane of the article opening that in an expanded condition is larger than the distance between opposite edges of the article wall surrounding the opening by an amount sufficient to enable the arms to respectively press against said opening opposite edges and secure the assembly to the article and then through the respective receiving opening to respective free-ends thereof that extend away from the side of the bridging member facing away from the opening for a distance sufficient to enable the arms to be contacted towards each other by hand an amount sufficient to contract the emlarged section an amount necessary to enable the removal of the assembly from the same side of the article opening in which the threaded member is received, and nut means disposed between the arms extending away from the side of the bridging portion facing towards the article opening, said nut means having an opening therethrough that is substantially coaxially aligned with the aperture through the bridging portion and adapted to receive the threaded member and enhance the securement of the threaded member to the assembly and said nut means having at least one open-sided outwardly facing slot disposed along one of the sides thereof facing towards one of the pair of spaced-apart arms extending away from the bridging portion with at least a portion of said arm being contained within the slot to the extent required to enable the arm to prevent rotation of the nut in response to rotation of the threaded member.

2. The assembly of claim 1 wherein the article opening extends through the article between opposite sides thereof and a portion of the enlarged section is provided with means for engaging the side of the article opposite to the side thereof from which the threaded member is to be received so as to enhance the securement of the assembly to the article when the portion of the enlargened section is in the expanded condition within the article opening.

3. The assembly of claim 1 wherein the arms extend integrally from the bridging portion.

4. The assembly of claim 1 wherein the nut is made from a material able to be threaded by the threads of the threaded member in response to rotation of the threaded member about the rotational axis thereof and the securement of the threaded member to the assembly is enhanced as a result of the engagement of the threads of the threaded member and the threads threaded into the nut by the threaded member.

5. The assembly of claim 1 having an open-sided outwardly facing slot disposed along the opposite side of the nut facing towards the other arm of the pair of spaced-apart arms extending away from the bridging portion facing towards the article opening and the means for preventing rotation of the nut is provided by at least a portion of both of said arms being contained within the respective slots to the extent required to enable the arms to prevent the rotation thereof in response to rotation of the threaded member.

6. The assembly of claim 1 wherein the threaded member is an adjustment screw for adjusting the direction of a vehicular headlight, said assembly including a screw having an annular groove adapted to engage a headlight frame used adjacent the position thereof in response to rotation of the screw.

* * * * *